Oct. 13, 1953     H. M. DUNN ET AL     2,655,161
FLUID SEPARATING AND PRESERVING MEANS FOR APPARATUS
FOR CLEANING VEHICLE RADIATORS OR THE LIKE
Filed Jan. 7, 1950     2 Sheets-Sheet 2
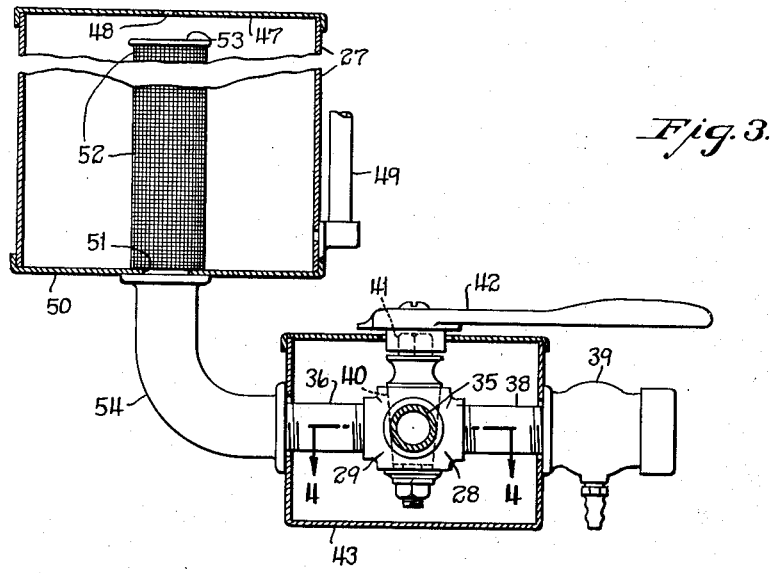
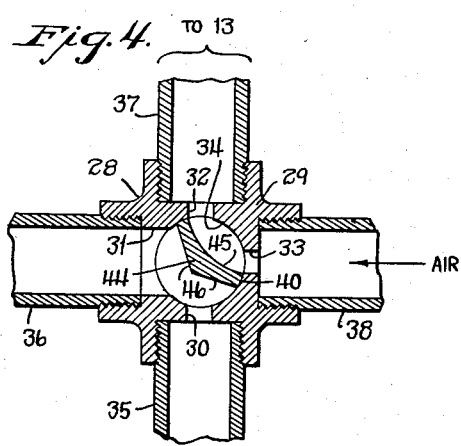
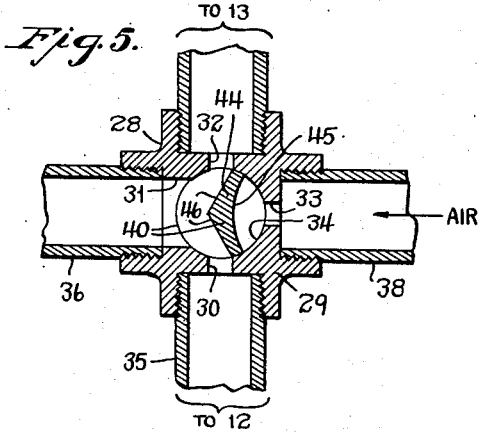
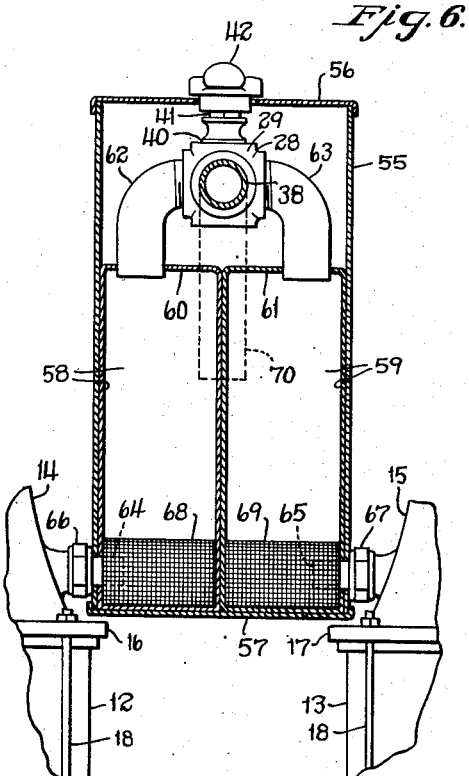
Henry M. Dunn
David Oles
Inventors
Seymour, Earle & Nichols
Attorney Patented Oct. 13, 1953

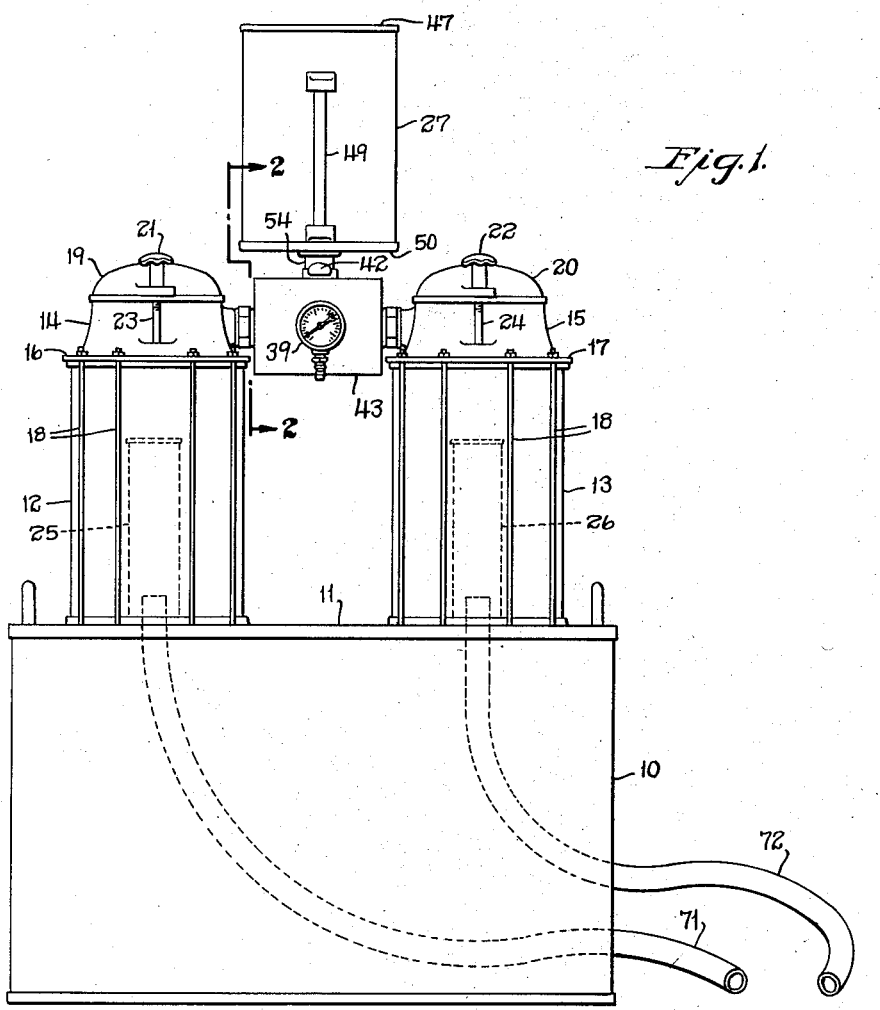
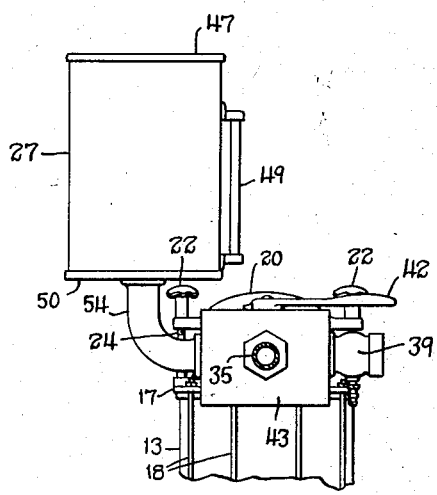

2,655,161

UNITED STATES PATENT OFFICE 2,655,161

FLUID SEPARATING AND PRESERVING MEANS FOR APPARATUS FOR CLEANING VEHICLE RADIATORS OR THE LIKE

Henry M. Dunn and David Oles, New Haven, Conn., assignors to Choldun Manufacturing Corporation, New Haven, Conn., a corporation of Connecticut Application January 7, 1950, Serial No. 137,422

3 Claims. (Cl. 134—111)

1

This invention relates in general to apparatus for cleaning radiators or the like and in particular to mobile apparatus for cleaning an automobile radiator by forcing a cleaning fluid through the radiator, first in one direction and then in the opposite direction, the present invention being an improvement over the apparatus of a co-pending application Serial No. 787,660 filed November 24, 1947, now abandoned.

An object of the present invention is to provide superior means for cleaning a radiator and articles of like nature.

A further object of the invention is to provide a superior radiator-cleaning apparatus of optimum efficiency and economy of construction, wherein a cleaning fluid is caused to surge back and forth through the radiator, to remove rust and other deleterious materials therefrom.

A further object of the invention is to provide a radiator-cleaning apparatus of the type referred to wherein means are provided for preventing the loss of cleaning fluid during a cleaning cycle.

A still further object of the invention is to provide radiator-cleaning apparatus of the type referred to having improved valve-means used in conjunction with an improved fluid-separator means for preserving substantially all of the cleaning fluid for use during the cleaning cycle.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a front elevational view of an apparatus for cleaning radiators or the like embodying the features of this invention;

Fig. 2 is a fragmentary sectional view partly in side elevation on the line 2—2 of Fig. 1, showing the fluid-separating chamber mounted at the back of the apparatus;

Fig. 3 is an enlarged side elevation in section of the fluid-separating chamber and valve-means of the apparatus of Figs. 1 and 2;

Fig. 4 is a fragmentary plan view in section on line 4—4 of Fig. 3 showing details of the improved valve-means of the apparatus, the valve-plug being shown in a position to permit compressed air to force cleaning fluid out of the right-hand cylinder into the left-hand cylinder of the apparatus, and to open the latter to the fluid-separating chamber;

Fig. 5 is similar to Fig. 4, but shows the valve

2 in its neutral position for permitting fluid in the fluid-separating chamber to flow simultaneously into both the left-hand and right-hand cylinders of the apparatus; and Fig. 6 is an enlarged front elevation in section of a modification of the fluid-separating chamber of the apparatus.

*The showing of Figs. 1 to 5 inclusive*

The present invention relates in particular to improvements in the radiator-cleaning apparatus, the improvements of this invention relating particularly to a novel valve and fluid-separating chamber for preserving substantially all of the cleaning fluid in the apparatus during the cleaning cycle, so as to insure maximum efficiency of operation.

In general, the apparatus comprises a substantially-rectangular cabinet 10 preferably made of sheet metal and provided with a top 11 which forms the supporting-base of the cleaning apparatus per se, which comprises a pair of hollow cylinders 12 and 13 formed preferably of glass. The lower ends of the cylinders are seated upon the top plate 11 of the cabinet, while the upper ends of the cylinders are engaged by cylindrical collars 14 and 15 respectively. Flanges 16 and 17 respectively circumscribe the lower edges of the collars and are adapted to be held down tightly in sealing engagement with the upper ends of the respective glass cylinders by a plurality of clamping-rods 18. Domed covers 19 and 20 are provided for closing the upper open ends of the collars 14 and 15 respectively, these covers being adapted to be clamped down tightly thereon by manually-operable handles 21 and 22 respectively, screw threaded onto corresponding studs 23 and 24 extending upwardly from the respective collars 14 and 15. Mounted within the cylinders are substantially-cylindrical filters 25 and 26 respectively, each filter being mounted over an aperture in the bottom of its respective cylinder. The connections between the apertures in the bottoms of the cylinders and the corresponding inlet- and outlet-pipes of an automobile radiator are conventional flexible hose, indicated at 71 and 72 respectively.

The salient features of the present invention are incorporated in a fluid-separating chamber 27 and an improved valve 28, both of which are illustrated especially well in Figs. 2 through 5.

The valve 28 is adapted to be connected to each of the cylinders 12 and 13, to the fluid-separating chamber 27 and to a source of compressed air (not shown), and to this end is of four-way construction embodying a valve-body 29 having four passages 30, 31, 32 and 33 respectively, lying in a common substantially-horizontal plane, the inner ends of these passages intersecting a central valve-chamber 34, the longitudinal axis of which is substantially perpendicular to the plane of the four intersecting passages 30, 31, 32 and 33. The longitudinal axes of the latter passages are at substantially 90° with respect to each other. Suitable nipples 35, 36, 37 and 38 are threaded in the outer ends of the valve-passages 30, 31, 32 and 33 respectively, the nipples 35 and 37 being used in conjunction with suitable couplings to connect the passages 30 and 32 of the valve to the cylinders 12 and 13 respectively and the nipples 36 and 38 to connect the valve-passages 31 and 33 to the fluid-separating chamber 27 and a fitting 39 respectively, the latter being for connecting the valve to a compressed-air supply.

The valve-chamber 34 is tapered substantially uniformly from its upper end to its lower end to accommodate a tapered valve-plug 40 which is rotatably mounted therein and which is provided at its upper end with a squared boss 41, on which is secured a valve-operating handle 42 for manually rotating the valve-plug in the valve-chamber 34. Suitable stops (not shown) are provided for limiting the angle of rotation of the valve-plug to substantially 90°, which is characteristic of this particular embodiment of the invention. It will be understood, however, that the angle of rotation of the valve-plug may vary, depending upon such factors as the sizes of the valve-passages and the valve-plug. For appearance's sake, the four-way valve 29 and its radially-projecting nipples 35, 36, 37 and 38 are enclosed within a substantially drum-shaped sheet-metal housing 43 having indicia thereon for indicating the positions of the handle for opening and closing the respective passages of the valve.

Intermediate the upper and lower ends of the tapered valve-plug 40, the body-portion thereof is cut out, as indicated in cross section in Figs. 4 and 5, to provide a substantially-transverse web 44, the face 45 of which is a substantially cylindrical surface. The opposite face of the valve-plug web 44 is substantially V-shaped and comprises two substantially-flat surfaces 46—46, the outer faces of which make an obtuse angle with respect to each other, the included angle being substantially 125°. The specific shape of this web-portion 44 of the valve-plug is such that in one angular position of the valve-plug the left-hand cylinder 12 of the apparatus will be connected directly by way of the nipple 35, the valve-passages 30 and 33 and the nipple 38 to the compressed-air fitting 39; the right-hand cylinder 13 of the apparatus being connected simultaneously by way of its nipple 37, the valve-passages 32 and 31 and the nipple 36 to the fluid-separating chamber 27. When the valve-plug is rotated through substantially 90° to its opposite position, as shown in Fig. 4, then the right-hand cylinder 13 of the apparatus will be connected directly by way of its nipple 37 and valve-passages 32 and 33 to the compressed-air fitting 39, while the left-hand cylinder 12 will be simultaneously connected directly by way of its nipple 35, the valve-passages 30 and 31 and the nipple 36 to the fluid-separating chamber 27. Between these two extreme left- and right-hand positions of the valve, is its central or neutral position, in which position the valve-plug 40 is adapted to close both the left- and right-hand cylinders of the apparatus from the compressed-air source and to open both the left- and right-hand cylinders to the valve-passage 31 and the nipple 36 of the fluid-separating chamber 27. To accomplish these functions of the valve, the cylindrical surface of revolution of the valve-web 44 subtends an angle of substantially 125°, which corresponds substantially to the included angle of the flat faces 46—46 of the web.

The fluid-separating chamber 27 is designed to receive aerated fluid from the right-hand and left-hand cylinders of the apparatus and to separate the cleaning liquid from the air occluded therein, the air escaping by way of a vent into the atmosphere, the liquid being retained in the chamber. To these ends, the latter is preferably a substantially-cylindrical can-like member closed at its upper end by a top-plate 47 provided with a substantially-central aperture 48 for venting air from the chamber. Mounted on the front of the fluid-separating chamber 27 is a water gauge 49 of conventional construction for determining visually the level of the liquid in the chamber at any chosen time. The bottom 50 of the chamber is provided with a central aperture 51, over which is mounted a substantially-cylindrical filter 52 which is similar to the filters 25 and 26 of the cylinders 12 and 13 respectively, except that it is provided with an imperforate cover-plate 53 over its upper end. The cover-plate 53 of the filter 52 is adapted to form a baffle immediately below the vent-aperture 48 of the container to deflect liquid downwardly as it enters the chamber by way of the aperture in the bottom thereof and hence prevent the escape of liquid through the vent-aperture 48 in the top of the chamber. The aperture 51 in the bottom of the chamber is connected by means of an elbow 54 to the nipple 36 of the valve 28 and, as shown especially well in Figs. 2 and 3, serves also to support the fluid-separating chamber above the cylinders and slightly to the rear thereof.

*Operation of the showing of Figs. 1 to 5 inclusive*

The cleaning action of the apparatus is obtained by surging a heated cleaning fluid from one cylinder of the apparatus to the other cylinder through the radiator or article being cleaned, this surging action being accomplished by means of compressed air successively applied to the bodies of cleaning fluid in each cylinder, the supply-pipe of the compressed air source being connected to the fitting 39 of the valve 28. Having supplied each cylinder with a predetermined quantity of cleaning fluid and made the appropriate connections by means of the flexible hose 71 and 72 between the cylinders and the inlet- and outlet-ports of the radiator to be cleaned, then by swinging the valve-operating handle 42 to the left, as seen in Fig. 1, the valve-plug 40 will be rotated through an angle such that a passage will be opened leading directly from the compressed-air fitting 39 to the left-hand cylinder 12 of the apparatus by way of the valve-passages 33 and 30. Simultaneously, the right-hand cylinder 13 will be connected by way of the valve-passages 32 and 31, the nipple 36, and elbow 54, with the fluid-separating chamber 27. The force of the compressed air then drives the cleaning fluid in the left-hand cylinder down through the aperture in the bottom thereof and from thence through the radiator, or article being cleaned, up into the right-hand cylinder. The quantity of cleaning fluid introduced into each cylinder is substantially half or less than half the capacity of each cylinder and, consequently, all of the liquid of the system may be forced by the compressed air into one or the other of the cylinders successively. As the cleaning fluid surges up into the right-hand cylinder, the air in the latter escapes by way of the valve-passages 32 and 31, the nipple 36 and elbow 54 into the fluid-separating chamber 27, and from thence by way of the vent 48 to the atmosphere. Moreover, any cleaning fluid which is carried along with the air or which is formed upwardly by the surging action into the fluid-separating chamber flows therein through its filter 52, which serves to separate the air from the liquid. Now, on swinging the valve-operating handle 42 to the right, the valve-plug will take the position shown in Fig. 4, whereby the right-hand cylinder of the apparatus is connected by way of the valve-passages 32 and 33 to the compressed-air fitting 39, while the left-hand cylinder is closed off from the compressed-air supply and connected by way of the valve-passages 30 and 31, the nipple 36 and elbow 54 to the fluid-separating chamber 27. Thereupon, the force of the compressed air acting on the fluid in the right-hand cylinder drives the fluid therefrom by way of the aperture in the bottom thereof through the radiator or article being cleaned, up into the left-hand cylinder of the apparatus. Simultaneously, air in the left-hand cylinder escapes by way of the valve-passages 30 and 31 into the fluid-separating chamber and from thence by way of its vent-aperture 48 to the atmosphere. Moreover, any liquid which is carried up into the fluid-separating chamber by the surging action of the fluid or by the air, is separated from the air in the chamber 27 and accumulated therein without loss to the system. To thoroughly clean the radiator, the above-described manual operations of the valve-handle are repeated successively for a predetermined length of time, during which time small quantities of cleaning fluid accumulate within the fluid-separating chamber between successive surges of the fluid through the apparatus. In this regard, it should be mentioned that since the overflow-liquid in the fluid-separating chamber is free to flow out therefrom into one or the other of the cylinders between successive operations of the valve-handle, the accumulation of overflow-liquid in the fluid-separating chamber occurs only as the result of a relatively-violent surging action which is achieved by moving the valve-operating handle rapidly back and forth between its two extreme positions. With each surge of liquid, some passes up into the fluid-separating chamber, and while a little of this overflow-liquid draws back on reversal of the valve-operating lever, a major portion of the overflow-liquid is prevented from flowing out by the onslaught of the next-succeeding incoming overflow-liquid.

After a predetermined quantity of overflow cleaning fluid has accumulated within the fluid-separating chamber as determined by the water gauge 49 on the front thereof, the operator sets the valve-operating handle in its neutral position, whereupon both the right- and left-hand cylinders are closed off from the compressed-air source and opened up by way of the passages 32, 31 and 30 respectively to the fluid-separating chamber 27, whereupon the overflow-liquid therein flows down through the elbow 54 and the aforesaid valve-passages into the left and right cylinders of the apparatus to replenish the supply of cleaning liquid therein. The manual operation of the valve-handle may then be continued until completion of the radiator-cleaning operation, without sustaining any loss in the quantity of cleaning fluid used in the cleaning operation. Moreover, the accumulation of cleaning liquid in the fluid-separating chamber is accomplished without detriment to the rapidity of the surging action of the cleaning fluid.

*The showing of Fig. 6*

In the showing of Fig. 6, certain of the parts correspond to those previously described herein and such parts have reference characters applied thereto which correspond to those previously employed.

Fig. 6 shows a modification of the means for separating the cleaning fluid and occluded air during the surging action of the apparatus. In this form of the invention, the fluid-separating chamber comprises a substantially-cylindrical sheet-metal shell 55 having top and bottom plates 56 and 57 respectively. Mounted within the shell 55 are two semicylindrical closed cells 58 and 59 respectively of substantially-identical construction, each having apertures in their top walls 60 and 61 respectively, in which apertures are fitted the lower ends of elbows 62 and 63 respectively which are connected at their opposite ends with the valve-passages 30 and 32 respectively of the above-described four-way valve 29. The cells 58 and 59 are also provided with apertures in the walls thereof adjacent the lower ends of the cells, in which apertures are fitted suitable nipples 64 and 65 respectively connected by couplings 66 and 67 respectively to the domed covers of the cylinders 12 and 13 of the apparatus.

To augment the separation of air and liquid in each cell, each cell is provided with a filter in the bottom thereof, these filters 68 and 69 respectively being opposite the corresponding nipples 64 and 65 of the cylinders 12 and 13.

In this modified construction, the valve-passage 31 of the valve is open directly to the atmosphere and is preferably provided with a vent-pipe 70 projecting downwardly on the back side of the housing 55.

*Operation of the showing of Fig. 6*

This modified device is used in substantially the same manner as that of the apparatus hereinabove described, but it will be noted that in this modified fluid-separating chamber, the compressed air is successively fed to the left- and right-hand cylinders 12 and 13 respectively of the apparatus by way of the valve-elbows 62 and 63 respectively, the fluid-separating cells 58 and 59 respectively and their respective filters 68 and 69. As the cleaning fluid is thus caused to surge from one cylinder into the opposite cylinder, the air in the latter cylinder escapes therefrom by way of its corresponding fluid-separating cell and the vent-pipe 70 of the valve. Simultaneously, any liquid carried by the air or carried up into the corresponding cell of the fluid-separating chamber by the surging action of the liquid passes through the filter of the cell and is separated from the air therein, the vertical height of each cell being such that any fluid carried into the cell is effectively prevented from escaping out of the air-vent pipe 70 of the valve. Although this modified form of the fluid-separating means of the radiator-cleaning apparatus may be used effectively for cleaning radiators and articles of similar nature, the rapidity of operation is somewhat less than that of the fluid-separating chamber and valve hereinabove described, due to the damping action of the vertical column of air in the cells 59 and 59 which are mounted between the compressed-air source and the respective cylinders 12 and 13.

Although the apparatus has been described specifically in conjunction with its use for cleaning automobile radiators, it will be understood that the device is applicable with equal success to the cleaning of engine blocks and articles of a related nature.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. In an apparatus for cleaning a radiator and articles of like nature by forcing cleaning liquid therethrough in alternate directions, the combination with a pair of receptacles adapted to contain cleaning fluid and flexible tubes connected to said receptacles and adapted to be connected to the inlet and outlet respectively of a radiator; of a manually-operated valve having four substantially-radial valve-passages; means to connect a pair of substantially diametrically-opposite valve-passages of said valve to the said pair of receptacles respectively; a fitting connected to a third valve-passage of said valve, said fitting being arranged to be connected to a compressed-air source for delivering compressed air to said valve; a vented fluid-separating chamber; and a fitting arranged to connect said fluid-separating chamber to the fourth valve-passage of said valve to support said fluid-separating chamber at an elevation above said receptacles and to provide a passage from said vented fluid-separating chamber to each of said receptacles.

2. In an apparatus for cleaning a radiator and articles of like nature by forcing cleaning liquid therethrough in alternate directions, the combination with a pair of receptacles adapted to contain cleaning fluid and flexible tubes connected to said receptacles and adapted to be connected to the inlet and outlet respectively of a radiator; of a manually-operated valve having four substantially-radial valve-passages; means to connect a pair of substantially diametrically-opposite valve-passages of said valve to the said pair of receptacles respectively; a fitting connected to a third valve-passage of said valve, said fitting being arranged to be connected to a compressed-air source for delivering compressed air to said valve; a vented fluid-separating chamber; a fitting arranged to connect said vented fluid-separating chamber to the fourth valve-passage of said valve to support said fluid-separating chamber at an elevation above said receptacles and to provide a passage from said fluid-separating chamber to each of said receptacles; and a valve-plug in said valve, said valve-plug having a recessed web-portion arranged in one extreme position of said valve-plug to connect one of said diametrically-opposite valve-passages with the valve-passage of said compressed-air fitting and in the opposite extreme position of said valve-plug to connect the other of said diametrically-opposite valve-passages with the valve-passage of said compressed-air fitting, and in a substantially-intermediate position to close off both of said diametrically-opposite valve-passages from the valve-passage of said compressed-air fitting and to open said diametrically-opposite valve-passages to the said fourth valve-passage of said valve to permit fluid to flow from the vented fluid-separating chamber substantially simultaneously into both of said receptacles.

3. In an apparatus for cleaning a radiator and articles of like nature by forcing cleaning liquid therethrough in alternate directions, the combination with a pair of receptacles adapted to contain cleaning fluid and flexible tubes adapted to be connected to said receptacles and to the inlet and outlet respectively of a radiator; of a manually-operated valve having four substantially-radial valve-passages; means to connect a pair of substantially diametrically-opposite valve-passages of said valve to the said pair of receptacles respectively; a fitting connected to a third valve-passage of said valve, said fitting being arranged to be connected to a compressed-air source for delivering compressed air to said valve; a vented fluid-separating chamber; a fitting arranged to connect said vented fluid-separating chamber to the fourth valve-passage of said valve to support said fluid-separating chamber at an elevation above said receptacles and to provide a passage from said fluid-separating chamber to each of said receptacles; and a valve-plug having a recessed web-portion provided with two oppositely-disposed faces, one of which comprises a concave curvilinear surface and the other of which comprises two planar surfaces intersecting at an angle with respect to each other, said recessed web-portion being arranged in one extreme position of said valve-plug to connect one of said diametrically-opposite valve-passages with the valve-passage of said compressed-air fitting and in the opposite extreme position of said valve-plug to connect the other of said diametrically-opposite valve-passages with the valve-passage of said compressed-air fitting, and in a substantially-intermediate position to close off both of said diametrically-opposite valve-passages from the valve-passage of said compressed-air fitting and to open said diametrically-opposite valve-passages to the said fourth valve-passage of said valve to permit fluid to flow from the vented fluid-separating chamber substantially simultaneously into both of said receptacles.

HENRY M. DUNN.
DAVID OLES.

References Cited in the file of this patent
UNITED STATES PATENTS

| Number | Name | Date |
|---|---|---|
| 425,448 | Mueller | Apr. 15, 1890 |
| 872,494 | Blackburn | Dec. 3, 1907 |
| 1,780,156 | Hall | Nov. 4, 1930 |
| 1,839,379 | Downing | Jan. 5, 1932 |
| 1,896,004 | Lewis et al. | Jan. 31, 1933 |
| 2,035,513 | Speranza | Mar. 31, 1936 |